(12) United States Patent
Tackabury et al.

(10) Patent No.: US 10,887,251 B2
(45) Date of Patent: Jan. 5, 2021

(54) FAULT-TOLERANT ARCHITECTURE FOR PACKET CAPTURE

(71) Applicants: International Business Machines Corporation, Armonk, NY (US); Napatech A/S, Soborg (DK)

(72) Inventors: Wayne F. Tackabury, West Tisbury, MA (US); Russell Couturier, Worcester, MA (US); William A. Bird, York (CA); Thomas D. Silliman, Leeds, MA (US); Alex Omo Agerholm, Hornbæk (DK); Michael Milde Lilja, Virum (DK); Peter Dahl Ekner, Hilleroed (DK); Philip Due Soeberg, Hornbæk (DK)

(73) Assignee: International Business Machines Corporation, Armonk, NY (US)

( * ) Notice: Subject to any disclaimer, the term of this patent is extended or adjusted under 35 U.S.C. 154(b) by 105 days.

(21) Appl. No.: 16/130,560

(22) Filed: Sep. 13, 2018

(65) Prior Publication Data

US 2020/0092227 A1    Mar. 19, 2020

(51) Int. Cl.
*G01R 31/08*    (2020.01)
*G06F 11/00*    (2006.01)
(Continued)

(52) U.S. Cl.
CPC .......... *H04L 49/252* (2013.01); *H04L 12/42* (2013.01); *H04L 41/046* (2013.01);
(Continued)

(58) Field of Classification Search
CPC ..... H04L 49/252; H04L 12/42; H04L 41/046; H04L 43/04; H04L 43/0817; H04L 43/10;
(Continued)

(56) References Cited

U.S. PATENT DOCUMENTS 5,020,058 A    5/1991  Holden et al.
5,485,465 A *  1/1996  Liu .......................... H04L 1/22
                                                        370/218
(Continued)

OTHER PUBLICATIONS

Gad, Kappes, Medina-Bulo, "Monitoring Traffic in Computer Networks with Dynamic Distributed Remote Packet Capturing," 2015 IEEE International Conference on Communications, 2015.
(Continued)

*Primary Examiner* — Stephen M D Agosta
(74) *Attorney, Agent, or Firm* — Troutman Pepper Hamilton Sanders LLP

(57) ABSTRACT

Embodiments are directed to a method of implementing a packet capture ring. The packet capture ring includes a plurality of appliances, and the plurality of appliances includes a first appliance and a second appliance. The first appliance and the second appliance are both attached to a network tap, and the first appliance works as a master appliance. The master appliance ingests packets from the network tap, encapsulates the packets and forwards encapsulated packets in the packet capture ring. The method includes: detecting, by the second appliance, a failure of the first appliance; working, by the second appliance, as the master appliance; and removing, by the second appliance, the first appliance from a forwarding designation list.

20 Claims, 8 Drawing Sheets

(51) Int. Cl.
| | |
|---|---|
| *G08C 15/00* | (2006.01) |
| *H04J 1/16* | (2006.01) |
| *H04J 3/14* | (2006.01) |
| *H04L 1/00* | (2006.01) |
| *H04L 12/26* | (2006.01) |
| *H04L 12/947* | (2013.01) |
| *H04L 12/42* | (2006.01) |
| *H04L 12/703* | (2013.01) |
| *H04L 12/24* | (2006.01) |

(52) U.S. Cl.
CPC ......... *H04L 41/0654* (2013.01); *H04L 43/04* (2013.01); *H04L 43/0817* (2013.01); *H04L 43/10* (2013.01); *H04L 45/28* (2013.01); *H04L 2012/421* (2013.01); *H04L 2212/00* (2013.01)

(58) Field of Classification Search
CPC .............. H04L 45/28; H04L 2012/421; H04L 2012/00; H04W 76/15; H04W 88/06; G06F 13/4072; G06F 13/4295
See application file for complete search history.

(56) References Cited

U.S. PATENT DOCUMENTS

| | | | | |
|---|---|---|---|---|
| 5,553,056 A | * | 9/1996 | Bronte | H04J 3/0608 370/253 |
| 6,397,260 B1 | * | 5/2002 | Wils | H04L 45/00 370/401 |
| 6,553,568 B1 | * | 4/2003 | Fijolek | H04L 29/06 348/E7.071 |
| 6,751,191 B1 | * | 6/2004 | Kanekar et al. | H04L 12/4641 370/217 |
| 7,203,173 B2 | | 4/2007 | Bonney et al. | |
| 7,239,629 B1 | * | 7/2007 | Olshansky | H04Q 3/0045 370/353 |
| 7,240,364 B1 | * | 7/2007 | Branscomb | H04L 29/12113 726/5 |
| 7,486,611 B1 | * | 2/2009 | Wilson | H04L 1/22 370/219 |
| 8,879,383 B1 | * | 11/2014 | Cirkovic | H04L 45/00 370/219 |
| 9,106,257 B1 | * | 8/2015 | Pohlack | H03M 13/09 |
| 10,044,634 B2 | | 8/2018 | Bird et al. | |
| 10,423,358 B1 | * | 9/2019 | Foo | G06F 3/0631 |
| 10,447,595 B2 | * | 10/2019 | Kallander | H04L 43/50 |
| 2003/0131287 A1 | * | 7/2003 | Mitchell | H04L 45/60 714/43 |
| 2004/0064725 A1 | * | 4/2004 | Padmanabhan | H04L 63/12 726/30 |
| 2006/0002309 A1 | * | 1/2006 | Ban | H04L 45/02 370/254 |
| 2007/0248029 A1 | * | 10/2007 | Merkey | H04L 43/02 370/255 |
| 2010/0019553 A1 | | 1/2010 | Yu | |
| 2010/0124196 A1 | * | 5/2010 | Bonar | H04W 16/16 370/329 |
| 2011/0125748 A1 | * | 5/2011 | Wood | G06F 16/903 707/737 |
| 2013/0028258 A1 | * | 1/2013 | Carney | H04L 45/742 370/392 |
| 2013/0326014 A1 | * | 12/2013 | Niu | H04L 61/2061 709/217 |
| 2013/0336191 A1 | * | 12/2013 | Zhao | H04L 45/16 370/312 |
| 2015/0052523 A1 | | 2/2015 | Raghu | |
| 2015/0370586 A1 | | 12/2015 | Cooper et al. | |
| 2016/0087861 A1 | * | 3/2016 | Kuan | H04L 43/065 709/224 |

OTHER PUBLICATIONS

Niksun Supreme Eagle 100 Gbps Datasheet, Niksun, Inc. (n.d.). Retrieved from the Internet: URL: (www.niksun.com/c/1/ds/NIKSUN_ ds_Supreme_eagle.pdf [retrieved on Sep. 13, 2018].

Braun, Didebulidze, et al., "Comparing and Improving Current Packet Capturing Solutions based on Commodity Hardware," Proceedings of the 10th ACM SIGCOMM conference on Internet measurement, 2010.

* cited by examiner

FAULT-TOLERANT ARCHITECTURE FOR PACKET CAPTURE

BACKGROUND

Packet capture is used for intercepting a data packet that is crossing or moving over a specific computer network. Once a packet is captured, it is stored temporarily so that it can be analyzed. The packet is inspected to help diagnose and solve network problems and determine whether network security policies are being followed.

FIG. 1 is a diagram depicting a typical fault-tolerant architecture for packet capture. Referring to FIG. 1, the primary packet capture appliance (referred to as "primary appliance") 102 is active, and stores packets received from a network tap and corresponding indexes in both a local and network attached storage. The hot-standby packet capture appliance (also referred to as "hot-standby appliance") 104 is inactive and monitors the primary appliance 102 through a variety of methodologies. The primary appliance 102 and the hot-standby appliance 104 are attached to a storage 106 through the network. As an example, a heartbeat of the primary appliance 102 is monitored to determine the health of the primary appliance 102. As another example, atomic operations are performed to synchronize the two appliances and coordinate the last packet processed by the primary appliance 102 prior to its failure. As yet another example, a recovery process is performed to coordinate the writing of the shared file system.

There are three major problems with the forgoing methodologies. Firstly, the hot-standby appliance 104 does not conduct any work until the primary appliance 102 fails, thereby resulting in the cost to duplicate the primary appliance 102. Secondly, the resource cost to coordinate the packet processing leads to reduction in packets captured by the primary appliance 102. Thirdly, the heartbeat used to determine the health of the primary appliance 102 is not sufficient for fault detection. Specifically, in a case where the tap or its physical network access monitoring has failed for reasons of involving the network adapter hardware or media, or the ingress point monitoring (e.g., span port) has failed, the heartbeat of the primary appliance 102 can still be detected. The heartbeat simply reflects the health of the CPU driving the primary appliance 102, instead of the capture point itself.

SUMMARY

Embodiments can provide a method of implementing a packet capture ring, wherein the packet capture ring includes a plurality of appliances, and the plurality of appliances includes a first appliance and a second appliance, wherein the first appliance and the second appliance are both attached to a network tap, and the first appliance works as a master appliance, wherein the master appliance ingests packets from the network tap, encapsulates the packets and forwards encapsulated packets in the packet capture ring. The method comprises detecting, by the second appliance, a failure of the first appliance; working, by the second appliance, as the master appliance; and removing, by the second appliance, the first appliance from a forwarding designation list.

Embodiments can further provide a method, further comprising: reconnecting remediated first appliance into the packet capture ring; and reinserting, by the second appliance, the remediated first appliance into the forwarding designation list.

Embodiments can further provide a method, further comprising: working, by the remediated first appliance, as an alternate appliance.

Embodiments can further provide a method, further comprising: working, by the remediated first appliance, as the master appliance; and working, by the second appliance, as an alternate appliance.

Embodiments can further provide a method, wherein the failure of the first appliance is detected if the second appliance fails to receive any encapsulated packet from the first appliance, or fails to receive a recent heart beat message from the first appliance.

Embodiments can further provide a method, wherein the master appliance encapsulates each packet with a time stamp and a designation header.

Embodiments can further provide a method, wherein each of the first appliance and the second appliance includes a first circular buffer for storing the packets from the network tap, and a second circular buffer for storing the encapsulated packets from the master appliance.

Embodiments can provide a system for packet capture and search, the system comprising: a plurality of appliances arranged in a ring configuration, wherein the plurality of appliances comprise a first appliance and a second appliance, both attached to a network tap. The first appliance works as a master appliance and comprises a first processor, configured to ingest packets from the network tap, encapsulate the packets and forward encapsulated packets around the plurality of appliances. The second appliance comprising a second processor, configured to: detect a failure of the first appliance; work as the master appliance; and remove the first appliance from a forwarding designation list.

Embodiments can further provide a system, wherein the second appliance is further configured to: reconnect remediated first appliance into the system; and reinsert the remediated first appliance into the forwarding designation list.

Embodiments can further provide a system, wherein the second appliance is further configured to: work, by the remediated first appliance, as an alternate appliance.

Embodiments can further provide a system, wherein the second appliance is further configured to: work, by the remediated first appliance, as the master appliance; and work, by the second appliance, as an alternate appliance.

Embodiments can further provide a system, wherein the second appliance is configured to detect the failure of the first appliance if the second appliance fails to receive any encapsulated packet from the first appliance, or fails to receive a recent heart beat message from the first appliance.

Embodiments can further provide a system, wherein each of the first appliance and the second appliance includes a first circular buffer for storing the packets from the network tap, and a second circular buffer for storing the encapsulated packets from the master appliance.

Embodiments can further provide a system, wherein the encapsulated packets in the second circular buffer lag behind the packets in the first circular buffer.

Embodiments can provide a computer program product for implementing a packet capture ring comprising a first appliance and a second appliance, both attached to a network tap. The first appliance works as a master appliance and comprises a first processor, configured to ingest packets from the network tap, encapsulate the packets, and forward encapsulated packets in the packet capture ring. The second appliance comprises a second processor; the computer program product comprising a computer readable storage medium having program instructions embodied therewith, the program instructions executable by the second processor to cause the second appliance to: detect a failure of the first appliance; work as the master appliance; and remove the first appliance from a forwarding designation list.

Embodiments can further provide a computer program product, wherein the program instructions further cause the second appliance to: reconnect remediated first appliance into the system; and reinsert the remediated first appliance into the forwarding designation list.

Embodiments can further provide a computer program product, wherein the program instructions further cause the second appliance to: work, by the remediated first appliance, as an alternate appliance.

Embodiments can further provide a computer program product, wherein the program instructions further cause the second appliance to: detect the failure of the first appliance if the second appliance fails to receive any encapsulated packet from the first appliance, or fails to receive a recent heart beat message from the first appliance.

Embodiments can further provide a computer program product, wherein each of the first appliance and the second appliance includes a first circular buffer for storing the packets from the network tap, and a second circular buffer for storing the encapsulated packets from the master appliance.

Embodiments can further provide a computer program product, wherein the encapsulated packets in the second circular buffer lag behind the packets in the first circular buffer.

Additional features and advantages are apparent from the following detailed description that proceeds with reference to the accompanying drawings.

BRIEF DESCRIPTION OF THE DRAWINGS

The foregoing and other aspects of the present invention are best understood from the following detailed description when read in connection with the accompanying drawings. For the purpose of illustrating the invention, there is shown in the drawings embodiments that are presently preferred, it being understood, however, that the invention is not limited to the specific instrumentalities disclosed. Included in the drawings are the following Figures.

DETAILED DESCRIPTION

According to embodiments disclosed herein, an environment for packet capture is provided. The packet capture ring described herein may be adapted for secure packet capture applications. The packet capture ring (i.e., packet capture stack) employs discrete processors (or appliances) in a tightly coupled and confederated configuration. One such appliance, referred to as "master appliance," maintains a tap port or promiscuous mode listener port to the network. The master appliance ingests packets, and forwards encapsulated packets with a designation header in two directions in the packet capture ring. This ensures that any appliance in the packet capture ring, even in the event of a failure of any appliance other than the master appliance, receives all the encapsulated packets. Another such appliance, referred to as "alternate appliance," receives raw packets from a network tap, in addition to the encapsulated packets from the master appliance or other packet capture appliance. This ensures that the alternate appliance can replace the master appliance in case that the master appliance fails or needs to be upgraded. For example, if the user needs to replace a fiber transceiver or change traffic rate of the packet capture ring, then the master appliance can be upgraded offline, and the alternate appliance can assume the responsibilities and work as a master appliance. The master appliance, the alternate appliance, and the other appliances are coupled in a private network bus, according to an embodiment. A designation is made across the packet capture ring as to a "currently designated" appliance to be servicing requests for indexing and storage of captured packets. This current designation shifts from appliance to appliance in the packet capture ring, as a "previously designated" appliance has its storage capacity filled.

If the alternate appliance stops receiving encapsulated packets from the master appliance or/and has not received a recent heart beat message from the master appliance, then the master appliance fails or is being upgraded. On detection of a master appliance failure or shutdown, the alternate appliance takes over as a master appliance and inherits the task of ingestion, designation, encapsulation, and forwarding the encapsulated packets. Once the previous master appliance is remediated, it simply becomes a new alternate appliance, which may work as a master appliance again in case of a failure or upgrade of the current master appliance.

The packet capture architecture described herein enables the packet capture ring to survive a failure of the master appliance with zero packet loss. Further, in the packet capture ring, any appliance including the master appliance can be upgraded in real time with zero packet loss. Additionally, a hot-standby appliance is not required, thereby resulting in a higher cost-efficient packet capture architecture without degradation in performance.

Figure 1:
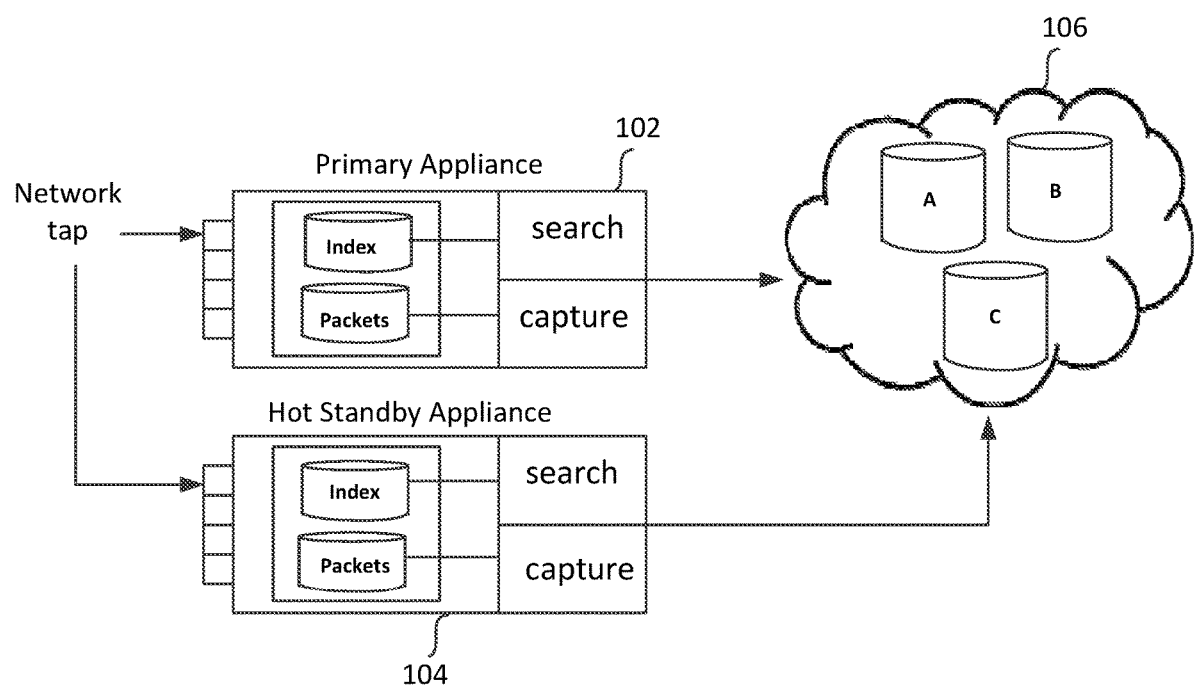
FIG. 1 is a diagram depicting a typical fault-tolerant architecture for packet capture.
Figure 2:
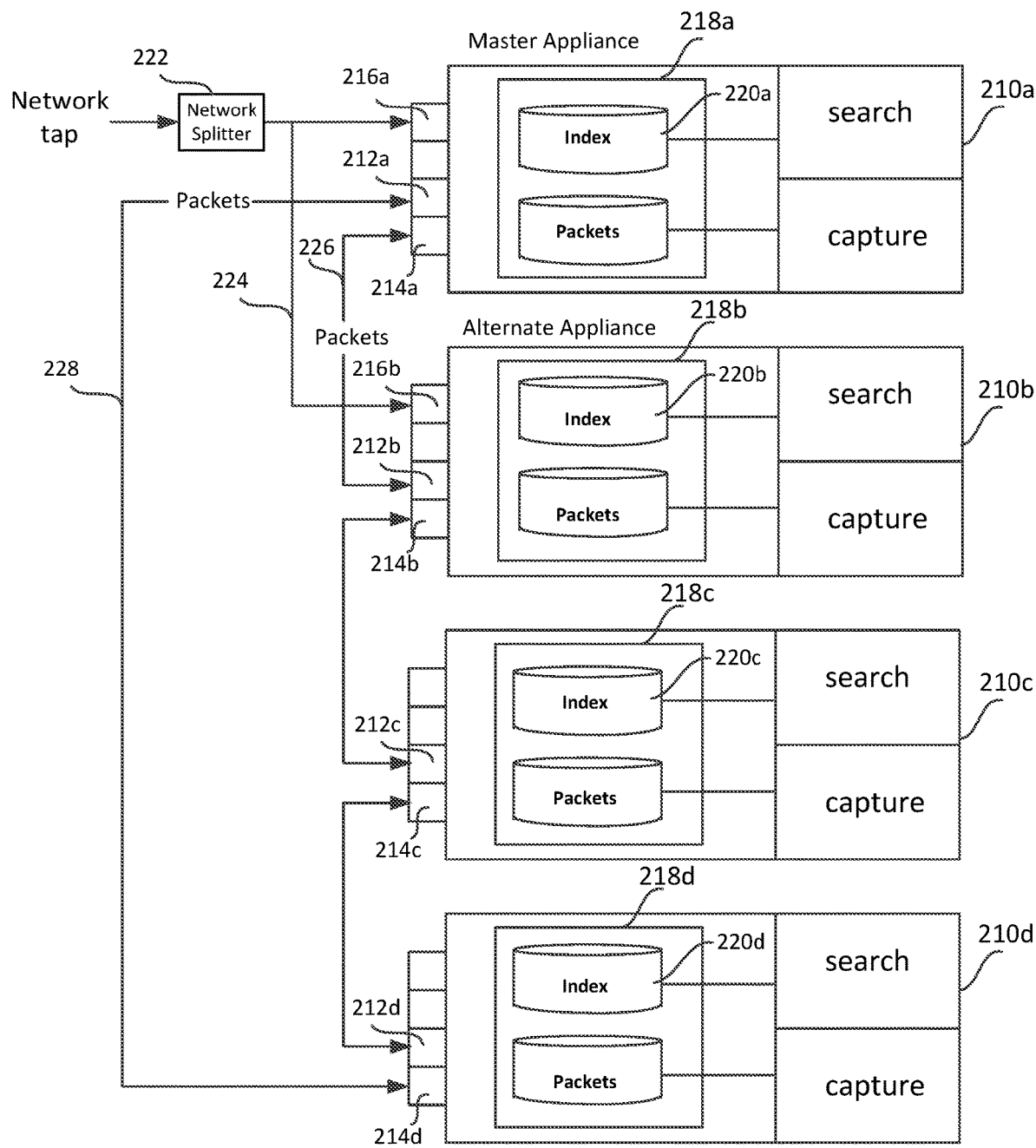
FIG. 2 is a diagram depicting a packet capture ring, according to embodiments provided herein.

FIG. 2 is a diagram depicting a packet capture ring 200, according to embodiments provided herein. As shown in FIG. 2, the packet capture ring 200 includes a plurality of packet capture appliances 210a-210d in a full duplex ring. In the embodiment shown, two of the packet capture appliances 210a-210d are network tap appliances, i.e., the master appliance and the alternate appliance. In the embodiment shown in FIG. 2, the packet capture appliance 210a is the master appliance, while the packet capture appliance 210b is the alternate appliance. Both the master appliance and the alternate appliance are the network tap appliances of the packet capture ring 200, and as shown there are four total packet capture appliances, 210a-210d. This is just one example configuration, and fewer or additional packet capture appliances may be included in the packet capture ring 200.

Referring to FIG. 2, each packet capture appliance has two network interfaces, specifically, 212a and 214a for packet capture appliance 210a; 212b and 214b for packet capture appliance 210*b*; 212*c* and 214*c* for packet capture appliance 210*c*; 212*d* and 214*d* for packet capture appliance 210*d*. Each appliance is networked to its successors (i.e., "descendants") using the two network interfaces. The network tap appliance 210*a* (i.e., the master appliance 210*a* in the embodiment shown in FIG. 2) has an additional interface 216*a* for ingesting packets from the network tap. Similarly, the network tap appliance 210*b* also (i.e., the alternate appliance 210*b* in the embodiment shown in FIG. 2) has an additional interface 216*b* for ingesting packets from the network tap. Network splitter 222, for example an Ethernet splitter, is coupled to the network tap, so that the same two packet streams are forwarded to the master appliance 210*a* and the alternate appliance 210*b* separately.

Each packet capture appliance has a locally attached repository, specifically, 218*a* for the packet capture appliance 210*a*; 218*b* for the packet capture appliance 210*b*; 218*c* for the packet capture appliance 210*c*; and 218*d* for the packet capture appliance 210*d*. Each locally attached repository stores packets and a juxtaposed index (220*a* for the packet capture appliance 210*a*; 220*b* for the packet capture appliance 210*b*; 220*c* for the packet capture appliance 210*c*; and 220*d* for the packet capture appliance 210*d*) that allows for retrieval of those packets. The packet repository may be indexed by one or more elements of timestamp, internet protocol (IP) addresses, medium access control (MAC) addresses, and ports associated with transmission control protocol (TCP) and user datagram protocol (UDP) flows. Other elements for indexing may also be added, such as a virtual local area network (VLAN) ID or encapsulation methodology. The elements may vary depending on, for example, a vendor.

According to an embodiment, the master appliance 210*a* ingests raw packets from the network tap, and sends two copies of encapsulated packets in two opposite directions around the ring 200 to its descendants (i.e., the alternate appliance 210*b* and the packet capture appliance 210*d*). According to an embodiment, the encapsulation includes a timestamp as observed and marked by the master appliance 210*a* and used by the subsequent appliances (alternate appliance 210*b*, the packet capture appliance 210*c*, and the packet capture appliance 210*d*) as the timestamp of reference. The encapsulation also includes a designation header that designates a packet capture appliance that is currently responsible for storing and indexing the packets (i.e., the active appliance), as further described herein.

Each appliance receives two copies of the encapsulated packets, with the latter arriving packet being ignored through a de-duplication process. This assures that two independent paths are always viable for each appliance regardless of failures in the packet capture ring 200. The master appliance 210*a* and the alternate appliance 210*b*, can each receive a copy of raw packets from the network tap, in addition to the two copies of the encapsulated packets.

The packet capture appliances store packets in a linear time-based fashion. When repository 218*a* fills to capacity in the first appliance 210*a*, repository 218*b* of the second appliance 210*b* is filled, and this is repeated until repository 218*d* of the final appliance 210*d* is filled. Once the final repository 218*d* is filled, the packet capture ring 200 rolls-over to the first appliance 210*a* and the least recently stored packets are written over with newly captured packets. The indexes of the associated packets that have been overwritten are accordingly removed. Each packet capture appliance has real-time access to any captured packet with the encapsulated timestamp and the designation header. The designation header designates which is the active appliance for packet storage.

Figure 3:
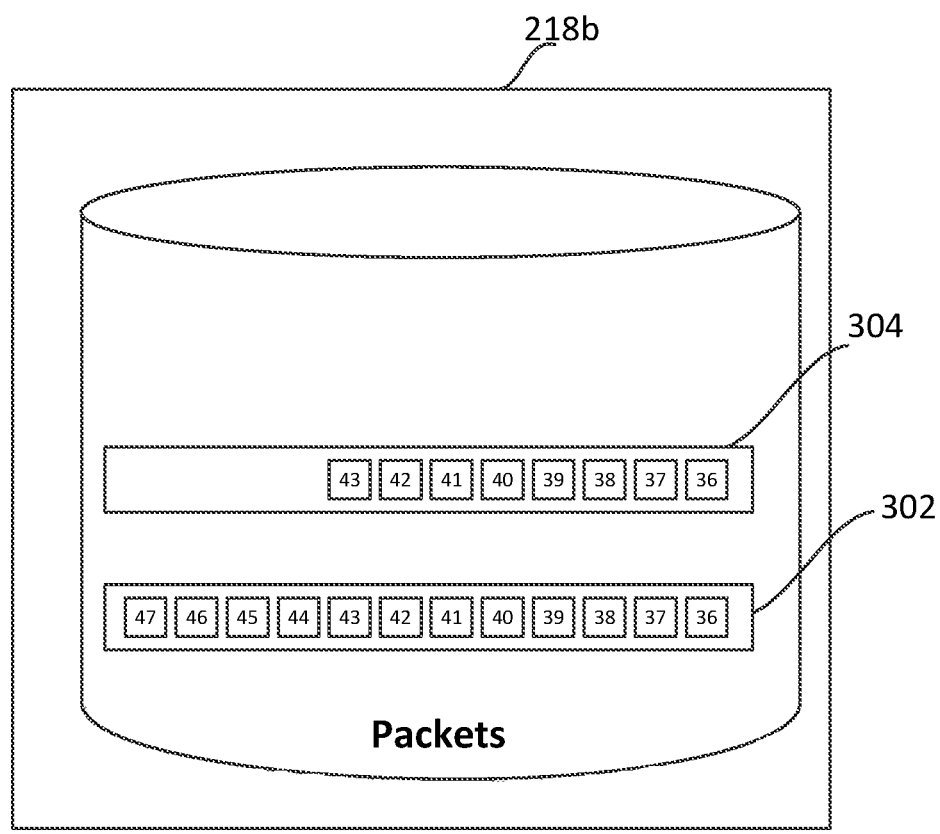
FIG. 3 is a diagram depicting a repository of an alternate appliance, according to embodiments provided herein.

Referring to FIG. 2 and FIG. 3, the repository 218*a* of the master appliance 210*a* and the repository 218*b* of the alternate appliance 210*b* each include two circular buffers. As an example, the repository 218*b* of the alternate appliance 210*b* includes circular buffer 302 for storing the raw packet stream from the network tap (via link 224) and circular buffer 304 for storing the encapsulated packet stream from the master appliance 210*a* (via link 226). The encapsulated packet stream has a latency than the raw packet stream, as the master appliance 210*a* has to ingest the raw packet stream, encapsulate the raw packet stream using host resources, and forward the encapsulated packet stream to the alternate appliance 210*b* via the link 226. For example, there are twelve packets (packet 36, packet 37, packet 38, . . . , packet 47) in the circular buffer 302, while there are eight encapsulated packets (packet 36, packet 37, packet 38, . . . , packet 43) in the circular buffer 304. The encapsulated packet stream in the circular buffer 304 lags behind the raw packet stream in the circular buffer 302.

In an embodiment, the master appliance 210*a* and the alternate appliance 210*b* both independently perform the same indexing operations on their own managed circular buffers 304 for storing the encapsulated packet stream, respectively. The current master appliance 210*a* multicasts the encapsulated packets to the current alternate appliance 210*b*, appliance 218*c* and appliance 218*d* in the packet capture ring 200. The alternate appliance 210*b* receives all the encapsulated packets from the current master appliance 210*a*. Thus, if the current master appliance 210*a* fails or needs to be upgraded, the current alternate appliance 210*b* can take over as a new master appliance. The current alternate appliance 210*b* knows the state of the packet data dissemination, and thus knows where to pick up the next encapsulated packet with no loss of continuity to the operations of the entire packet capture ring 200.

Figure 4:
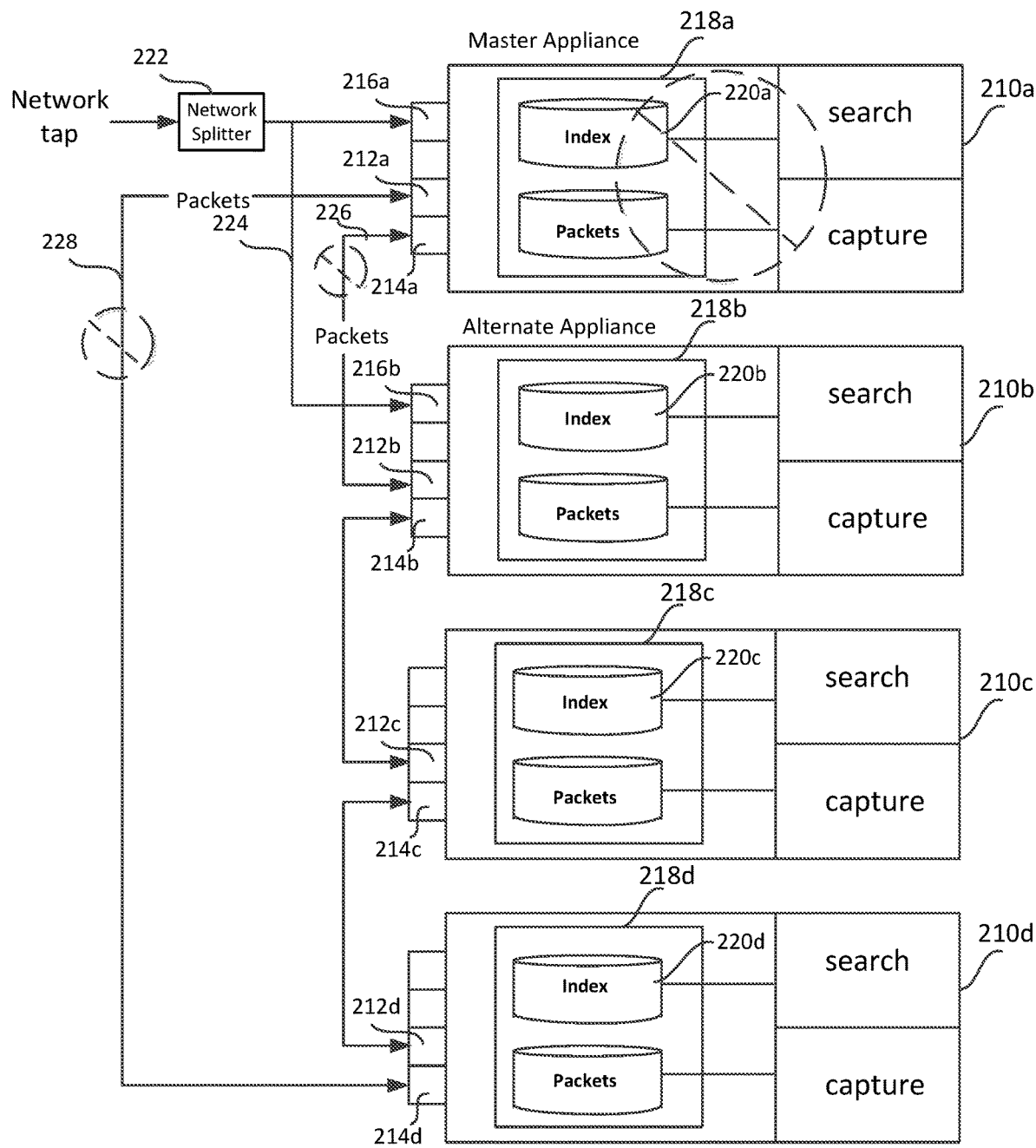
FIG. 4 is a diagram depicting a fault tolerance aspect of a packet capture ring, according to an embodiment.

As shown in FIG. 4, in an embodiment, the master appliance 210*a* stops working, with links 226 and 228 not in use. The failed master appliance 210*a* is temporarily removed from service of the ring 200. If the alternate appliance 210*b* does not receive any encapsulated packet from the master appliance 210*a*, or/and does not receive a recent heart beat message from the master appliance 210*a*, then the alternate appliance 210*b* learns that the master appliance 210*a* either fails or is being upgraded or maintained. Accordingly, the master appliance 210*a* is removed from the valid forwarding designation list (a list recording all the available appliances to be designated in the ring 200). The master appliance 210*a* is skipped as a forwarding designation and the encapsulated packets are routed through the remaining connections. The alternate appliance 210*b* takes over and assumes responsibilities as a new master appliance. As an example, the alternate appliance 210*b* identifies the last encapsulated packet produced by the master appliance 210*a* (illustrated as packet 43 in FIG. 3) in the circular buffer 304 and continues to encapsulate the next sequential packet (illustrated as packet 44 in FIG. 3) in the circular buffer 302. The switchover requires no atomic packet synchronization and uses very little resources, and does not result in any degradation of the service. The alternate appliance 210*b* switches to work as a master appliance. Specifically, the alternate appliance 210*b* ingests raw packets from the network tap, designates the next appliance in the ring 200 if the previously designated appliance has its storage capacity filled, encapsulates the raw packets including time-stamping, and forwards the encapsulated packets to the descendant 210c.

Figure 5:
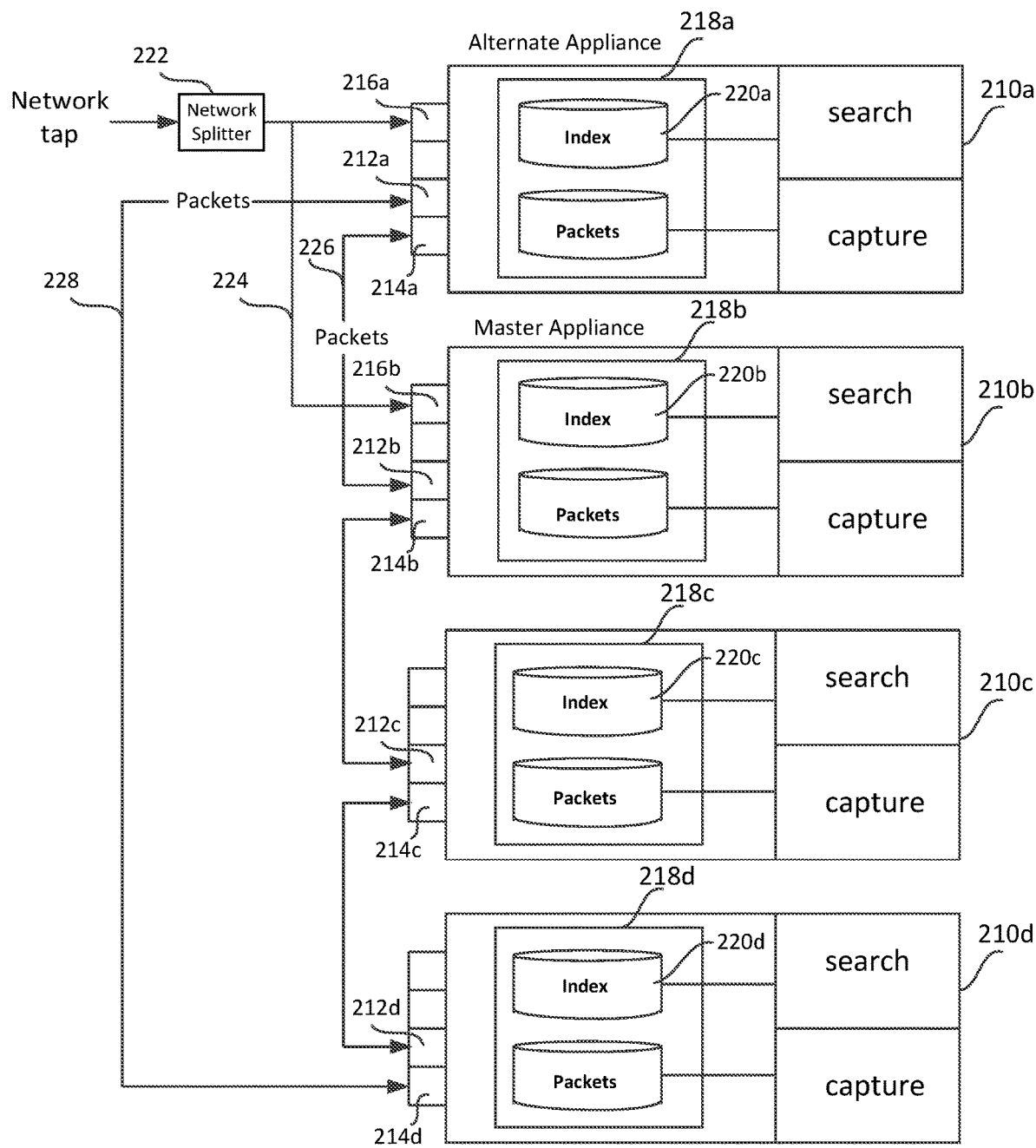
FIG. 5 is a diagram depicting a fault recovery aspect of a packet capture ring, according to an embodiment.

Once the appliance 210a is remediated, referring to FIG. 5, the appliance 210a is put back to the previous position and reconnected. However, in an embodiment, the remediated appliance 210a works as an alternate appliance while the appliance 210b stills works as a master appliance. In case that the appliance 210b fails or needs to be upgraded or maintained, then the appliance 210a can work as a master appliance again. In another embodiment, the remediated appliance 210a directly works as a master appliance once it is inserted back, while the appliance 210b assumes the responsibility as an alternate appliance again.

When the appliance 210a is inserted back in the packet capture ring 200, the appliance 210b recognizes the heartbeat message from the appliance 210a and inserts the appliance 210a back into the valid forwarding designation list. If the appliance 210a can be recovered prior to the appliance 210a missing itself as the contiguous designation, no packets in the associated repository 218a will be lost. If the appliance 210a is "lapped" or bypassed and misses its slot in the forwarding designation round-robin, all packets in the associated repository 218a will be considered non-searchable and obsolete.

Figure 6:
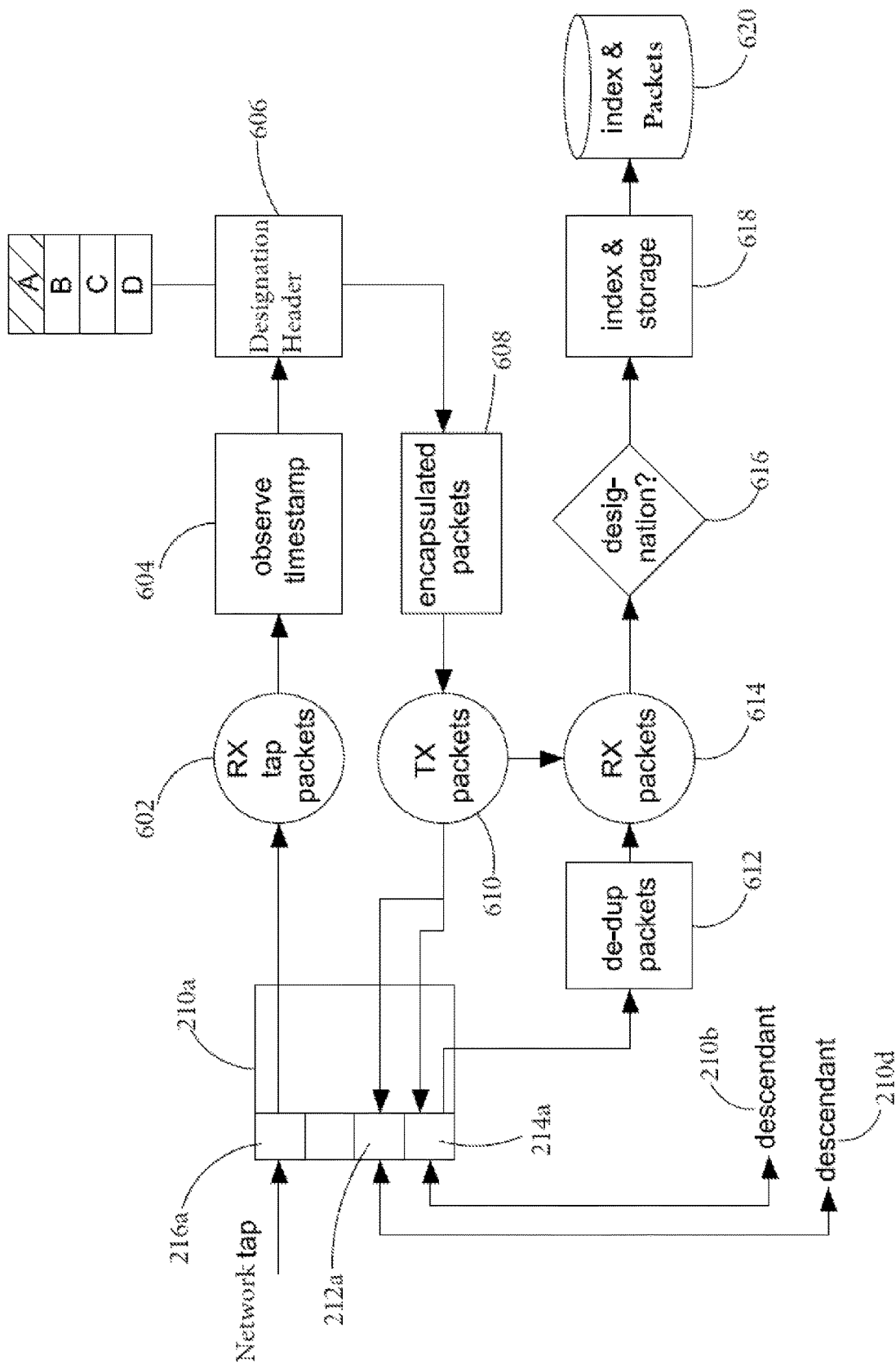
FIG. 6 is a diagram depicting data flow related to a network tap appliance, according to embodiments herein.

According to embodiments, FIG. 6 provides a data flow 600 of the master appliance 210a prior to its failure. At step 602, through the network interface 216a, the master appliance 210a receives packets. At step 604, a timestamp upon receipt of a packet is observed; and at step 606, the designation header is noted. At step 608, the packets are encapsulated, and at step 610/614, the encapsulated packets are transmitted and received at the master appliance 210a to avoid sending packets around the ring 200 before storing them. The encapsulated packets are also transmitted (at step 610) via the network interfaces 212a and 214a of the master 210a to its descendants 210b and 210d.

When receiving packets, as previously discussed, duplicate packets are received at network interfaces 212a and 214a, and at step 612 a de-duplication process is performed. At step 614, the encapsulated packets are received by the master appliance 210a. At step 616, a determination as to the designation is made (i.e., the timestamp and the designation header). At step 618, indexing and storage operations are initiated, with 620 indicating the indexed and stored encapsulated packets at the repository 218a of the master appliance 210a.

According to an embodiment, a control protocol (CP) to manage the repositories, the appliance designations, and multiple failure scenarios, between all appliances of the packet capture ring 200, is provided. According to embodiments, the CP facilitates an ability to broadcast the desired fill level to all appliances in the packet capture ring 200, from the master appliance 210a; an ability of the packet capture appliances to broadcast their percent full level to all appliances in the packet capture ring 200; an ability to broadcast any failures detected by neighbor appliances due to link failures; and an ability of the packet capture appliances to broadcast a heartbeat message containing an appliance identifier. The CP advantageously allows for the ability to do quick broadcast for desired storage saturation levels, and the ability of the appliances to adjust for future packet storage as those appliances become designated.

The network tap appliance 210a (i.e., the master appliance) coordinates packet storage activity, and accordingly periodically broadcasts a CP message to all appliances in the ring 200 containing a desired percent fill level of repositories. This directs the capacity fill level of each respective packet repository, enabling the ability for a packet capture appliance to broadcast the current percent fill level via the CP when it is storing packets, and signal the master appliance 210a to change the designation; and the ability for the master appliance 210a to effectively increase the search and packet retrieval speed by directing the maintenance of smaller packet repositories (explained in further detail below).

The master appliance 210a listens for CP broadcast messages, for example, link failure messages, heartbeat failure messages, percent full level messages from the other appliances 210b-210d to get the status of each appliance. Specifically, in case of a link failure message, the ring 200 is disconnected or the ring 200 is powered off. In case of missing a heartbeat message, an operating system, an application, or a disk fails. In case of a percent full level message, the storage capacity of the current designated appliance is filled, and thus it is necessary to designate the next appliance, so that the encapsulated packets can be forwarded to the next designated appliance.

The master appliance 210a ingests de-duplicated packets and initially designates itself as the active appliance. The master appliance 210a records the packets with associated indexes as previously described.

The master appliance 210a then encapsulates packets with the originally observed timestamp and designation header. In this case, at a point of ring resource "full availability," it designates itself.

When the master appliance 210a reaches the desired percent capacity, it simply stops storing packets and changes the forwarding designation. The next appliance (e.g., alternate 210b) becomes active and broadcasts a current percent fill level message, while storing and indexing packets. The master network tap appliance 210a is aware of the repository capacity through broadcast messages and simply changes the forwarding designation at the appropriate time.

This is repeated with each appliance until the entire ring 200 "rolls over"—signaling full usage of appliance repositories 218a-218d—and stores new encapsulated packets at the least-recently used appliance and repository (presumably 210a and 218a in this embodiment).

Each appliance repository has a time window segment of the contiguous packet stream with a juxtaposed index, as shown below in Table 1. This segmentation of time by appliances has significant positive implications for large packet retrievals, as described herein.

TABLE 1

Time window segments of each appliance

| Appliance | Time Window Segment | Packet Repository | Index |
| --- | --- | --- | --- |
| 210a | $T^1$ to $T^2$ | 218a | 220a |
| 210b | $T^{2^1}$ to $T^3$ | 218b | 220b |
| 210c | $T^{3^1}$ to $T^4$ | 218c | 220c |
| 210d | $T^{4^1}$ to $T^5$ | 218d | 220d |

The following steps reflect an example of the search results capabilities of the ring 200: Firstly, a query is requested by a third party application and sent simultaneously via CP to all appliances; "all packets that have a server IP address of 128.234.56.8 and a server port of 773" is an example query. Secondly, each appliance (210a-210d) searches its respective repository (218a-218d) using the associated index (220a-220d) and returns results for the window of time that it retains. Thirdly, since time is contiguous from one appliance to the next, the results can be merged by simply concatenating the individual search result sets. At any time, according to embodiments herein, all but the appliance that is currently responsible for the capture can supply 100 percent of the respective resources for searching.

Figure 7:
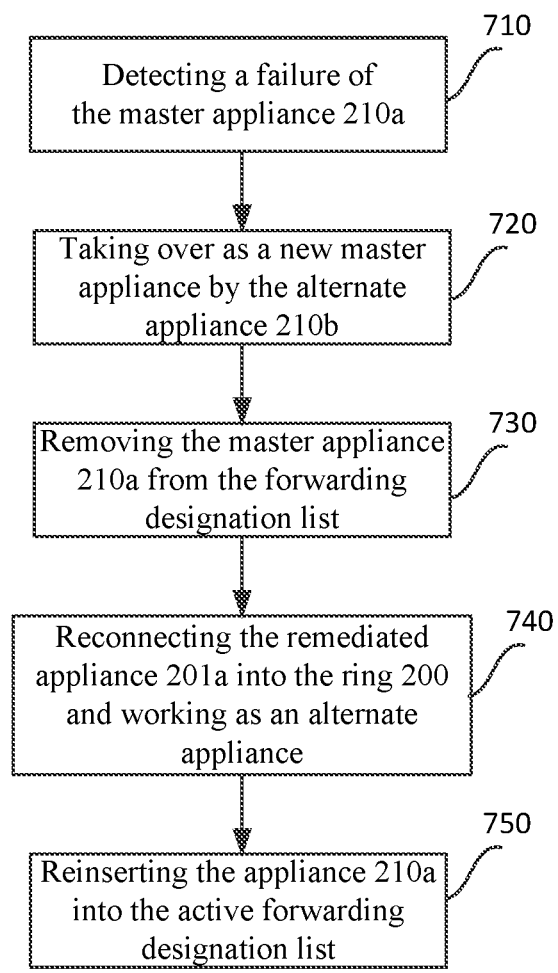
FIG. 7 is a flowchart illustrating a method of implementing a fault-tolerant packet capture ring, according to an embodiment.

FIG. 7 is a flowchart illustrating a method 700 of implementing a fault-tolerant packet capture ring 200, according to an embodiment. At step 710, the alternate appliance 210b detects that the master appliance 210a fails. If the alternate appliance 210b does not receive any encapsulated packet from the master appliance 210a, and does not receive a recent heart beat message from the master appliance 210a, then the master appliance 210a stops working. At step 720, the alternate appliance 210b takes over and assumes responsibilities as a new master appliance. The appliance 210b ingests raw packets from the network tap, designates the next appliance in the ring 200 if the previously designated appliance has its storage capacity filled, encapsulates each raw packet with a time stamp and a designation header, and forwards the encapsulated packets to the descendant 210c. At step 730, the master appliance 210a is removed from the active forwarding designation list. The master appliance 210a is skipped as a forwarding designation. If the repository 218d of the appliance 210d meets the capacity limit, the subsequent encapsulated packets will be forwarded to the appliance 210b (i.e., the current master appliance). The residual encapsulated packets in the repository 218a of the failed appliance 210a are considered non-searchable and obsolete. At step 740, the remediated appliance 210a is reconnected into ring 200 and works as an alternate appliance if the appliance 210b receives a heartbeat from the appliance 210a. At step 750, the appliance 210a is reinserted into the active forwarding designation list. If the repository 218d of the appliance 210d meets the capacity limit, the subsequent encapsulated packets will be forwarded to the appliance 210a (i.e., the current alternate appliance).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a head disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network (LAN), a wide area network (WAN) and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object-oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including LAN or WAN, or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatuses (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operations steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical functions. In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 8:
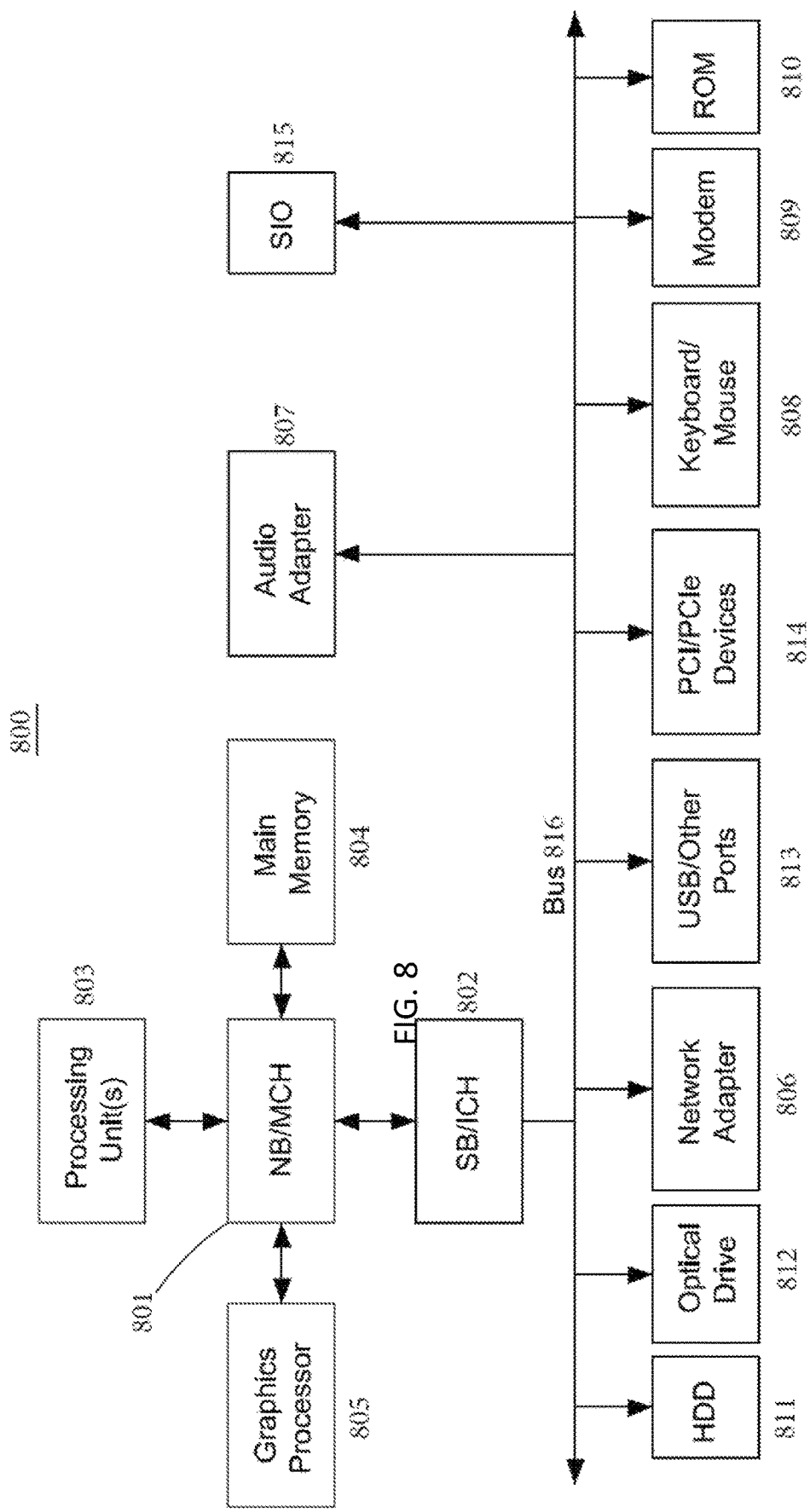
FIG. 8 is a block diagram of an example data processing system in which aspects of the illustrative embodiments are implemented.

FIG. 8 is a block diagram of an example data processing system 800 in which aspects of the illustrative embodiments are implemented. Data processing system 800 is an example of a computer, such as a server or client, in which computer usable code or instructions implementing the process for illustrative embodiments of the present invention are located. In one embodiment, FIG. 8 may represent a server computing device.

In the depicted example, data processing system 800 can employ a hub architecture including a north bridge and memory controller hub (NB/MCH) 801 and south bridge and input/output (I/O) controller hub (SB/ICH) 802. Processing unit 803, main memory 804, and graphics processor 805 can be connected to the NB/MCH 801. Graphics processor 805 can be connected to the NB/MCH 801 through, for example, an accelerated graphics port (AGP).

In the depicted example, a network adapter 806 connects to the SB/ICH 802. An audio adapter 807, keyboard and mouse adapter 808, modem 809, read only memory (ROM) 810, hard disk drive (HDD) 811, optical drive (e.g., CD or DVD) 812, universal serial bus (USB) ports and other communication ports 813, and PCI/PCIe devices 814 may connect to the SB/ICH 802 through bus system 816. PCI/PCIe devices 814 may include Ethernet adapters, add-in cards, and PC cards for notebook computers. ROM 810 may be, for example, a flash basic input/output system (BIOS). The HDD 811 and optical drive 812 can use an integrated drive electronics (IDE) or serial advanced technology attachment (SATA) interface. A super I/O (SIO) device 815 can be connected to the SB/ICH 802.

An operating system can run on processing unit 803. The operating system can coordinate and provide control of various components within the data processing system 800. As a client, the operating system can be a commercially available operating system. An object-oriented programming system, such as the Java™ programming system, may run in conjunction with the operating system and provide calls to the operating system from the object-oriented programs or applications executing on the data processing system 800. As a server, the data processing system 800 can be an IBM® eServer™ System p® running the Advanced Interactive Executive operating system or the Linux operating system. The data processing system 800 can be a symmetric multiprocessor (SMP) system that can include a plurality of processors in the processing unit 803. Alternatively, a single processor system may be employed.

Instructions for the operating system, the object-oriented programming system, and applications or programs are located on storage devices, such as the HDD 811, and are loaded into the main memory 804 for execution by the processing unit 803. The processes for embodiments described herein can be performed by the processing unit 803 using computer usable program code, which can be located in a memory such as, for example, main memory 804, ROM 810, or in one or more peripheral devices.

A bus system 816 can be comprised of one or more busses. The bus system 816 can be implemented using any type of communication fabric or architecture that can provide for a transfer of data between different components or devices attached to the fabric or architecture. A communication unit such as the modem 809 or the network adapter 806 can include one or more devices that can be used to transmit and receive data.

Those of ordinary skill in the art will appreciate that the hardware depicted in FIG. 8 may vary depending on the implementation. Other internal hardware or peripheral devices, such as flash memory, equivalent non-volatile memory, or optical disk drives may be used in addition to or in place of the hardware depicted. Moreover, the data processing system 800 can take the form of any of a number of different data processing systems, including but not limited to, client computing devices, server computing devices, tablet computers, laptop computers, telephone or other communication devices, personal digital assistants, and the like. Essentially, data processing system 800 can be any known or later developed data processing system without architectural limitation.

The system and processes of the figures are not exclusive. Other systems, processes, and menus may be derived in accordance with the principles of embodiments described herein to accomplish the same objectives. It is to be understood that the embodiments and variations shown and described herein are for illustration purposes only. Modifications to the current design may be implemented by those skilled in the art, without departing from the scope of the embodiments. As described herein, the various systems, subsystems, agents, managers, and processes can be implemented using hardware components, software components, and/or combinations thereof. No claim element herein is to be construed under the provisions of 35 U.S.C. 112(f) unless the element is expressly recited using the phrase "means for."

The present description and claims may make use of the terms "a," "at least one of," and "one or more of," with regard to particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples are intended to be non-limiting and are not exhaustive of the various possibilities for implementing the mechanisms of the illustrative embodiments. Those skilled in the art will appreciate that numerous changes and modifications may be made to the preferred embodiments of the invention and that such changes and modifications may be made without departing from the true spirit of the invention. It is therefore intended that the appended claims be construed to cover all such equivalent variations as fall within the true spirit and scope of the invention.

We claim:

1. A method of implementing a packet capture ring, wherein the packet capture ring includes a plurality of appliances, and the plurality of appliances includes a first appliance, a second appliance, and one or more third appliances, the method comprising:
working, by the first appliance, as a master appliance, wherein the first appliance and the second appliance are both attached to a network tap; the first appliance, the second appliance, and the one or more third appliances are connected in sequence to form a ring structure; the master appliance ingests packets from the network tap, encapsulates the packets and forwards encapsulated packets in two opposite directions around the packet capture ring; the second appliance and each third appliance receive two copies of the encapsulated packets; each appliance includes a repository for storing the encapsulated packets and an index associated with each stored encapsulated packet each encapsulated packet includes a time stamp and a designation header for designating one appliance in the ring structure for storing and indexing the each encapsulated packet;
detecting, by the second appliance, a failure of the first appliance;
working, by the second appliance, as the master appliance; and
removing, by the second appliance, the first appliance from a forwarding designation list for remediation.

2. The method of claim 1, further comprising:
reconnecting remediated first appliance into the packet capture ring; and
reinserting, by the second appliance, the remediated first appliance into the forwarding designation list.

3. The method of claim 2, further comprising:
working, by the remediated first appliance, as an alternate appliance.

4. The method of claim 2, further comprising:
working, by the remediated first appliance, as the master appliance; and
working, by the second appliance, as an alternate appliance.

5. The method of claim 1, wherein the failure of the first appliance is detected if the second appliance fails to receive any encapsulated packet from the first appliance, or fails to receive a recent heart beat message from the first appliance.

6. The method of claim 1, wherein each of the first appliance and the second appliance includes a first circular buffer for storing the packets from the network tap, and a second circular buffer for storing the encapsulated packets from the master appliance.

7. The method of claim 1, further comprising:
accessing, by any of the plurality of appliances in the ring structure, any encapsulated packet using the timestamp and the designation header.

8. A system for packet capture and search, the system comprising:
a plurality of appliances arranged in a ring configuration, wherein the plurality of appliances comprise a first appliance, a second appliance, and one or more third appliances, wherein the first appliance, the second appliance, and the one or more third appliances are connected in sequence to form the ring configuration, wherein the first appliance and the second appliance are both attached to a network tap,
wherein the first appliance works as a master appliance and comprises a first processor, configured to ingest packets from the network tap, encapsulate the packets and forward encapsulated packets in two opposite directions around the the ring configuration, wherein the second appliance and each third appliance receive two copies of the encapsulated packets; each appliance includes a repository for storing the encapsulated packets and an index associated with each stored encapsulated packet each encapsulated packet includes a time stamp and a designation header for designating one appliance in the ring configuration for storing and indexing the each encapsulated packet;
wherein the second appliance comprising a second processor, configured to:
detect a failure of the first appliance;
work as the master appliance; and
remove the first appliance from a forwarding designation list for remediation.

9. The system of claim 8, wherein the second appliance is further configured to:
reconnect remediated first appliance into the system; and
reinsert the remediated first appliance into the forwarding designation list.

10. The system of claim 9, wherein the second appliance is further configured to:
work, by the remediated first appliance, as an alternate appliance.

11. The system of claim 9, wherein the second appliance is further configured to:
work, by the remediated first appliance, as the master appliance; and
work, by the second appliance, as an alternate appliance.

12. The system of claim 8, wherein the second appliance is configured to detect the failure of the first appliance if the second appliance fails to receive any encapsulated packet from the first appliance, or fails to receive a recent heart beat message from the first appliance.

13. The system of claim 8, wherein each of the first appliance and the second appliance includes a first circular buffer for storing the packets from the network tap, and a second circular buffer for storing the encapsulated packets from the master appliance.

14. The system of claim 13, wherein the encapsulated packets in the second circular buffer lag behind the packets in the first circular buffer.

15. A computer program product for implementing a packet capture ring comprising a first appliance, a second appliance, and one or more third appliances, wherein the first appliance comprises a first processor and works as a master appliance; wherein the second appliance comprises a second processor; the computer program product comprising a computer readable storage medium having program instructions embodied therewith, the program instructions executable by the second processor to cause the second appliance to:

detect a failure of the first appliance, wherein the first appliance and the second appliance are both attached to a network tap; wherein the first appliance, the second appliance, and the one or more third appliances are connected in sequence to form a ring structure; the master appliance ingests packets from the network tap, encapsulates the packets and forwards encapsulated packets in two opposite directions around the packet capture ring; the second appliance and each third appliance receive two copies of the encapsulated packets; each appliance includes a repository for storing the encapsulated packets and an index associated with each stored encapsulated packet each encapsulated packet includes a time stamp and a designation header for designating one appliance in the ring structure for storing and indexing the each encapsulated packet;

work as the master appliance, wherein the master appliance ingests packets from the network tap, encapsulate the packets, and forward encapsulated packets in the packet capture ring, wherein each appliance in the packet capture ring receives two copies of the encapsulated packets; and remove the first appliance from a forwarding designation list for remediation.

16. The computer program product of claim 15, wherein the program instructions further cause the second appliance to:

reconnect remediated first appliance into the system; and
    reinsert the remediated first appliance into the forwarding designation list.

17. The computer program product of claim 16, wherein the program instructions further cause the second appliance to:

work, by the remediated first appliance, as an alternate appliance.

18. The computer program product of claim 16, wherein the program instructions further cause the second appliance to:

detect the failure of the first appliance if the second appliance fails to receive any encapsulated packet from the first appliance, or fails to receive a recent heart beat message from the first appliance.

19. The computer program product of claim 16, wherein each of the first appliance and the second appliance includes a first circular buffer for storing the packets from the network tap, and a second circular buffer for storing the encapsulated packets from the master appliance.

20. The computer program product of claim 19, wherein the encapsulated packets in the second circular buffer lag behind the packets in the first circular buffer.

* * * * *